May 2, 1933.  A. HEYL  1,906,855
LONG DISTANCE CONDUIT FOR CONVEYING FLUIDS AT HIGH PRESSURE
Filed July 31, 1931
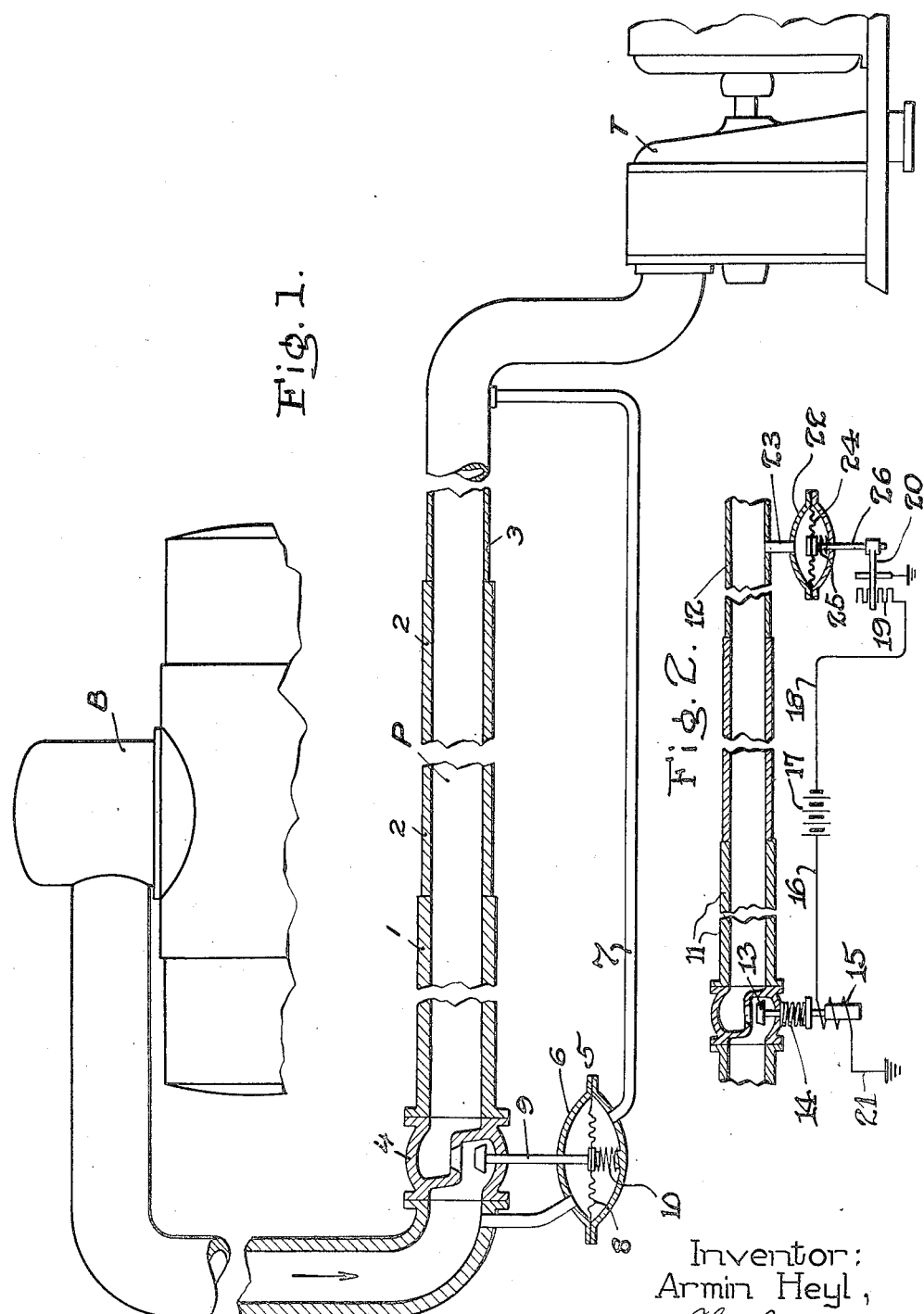
Inventor:
Armin Heyl,
by Charles E. Tullar
His Attorney.

Patented May 2, 1933

1,906,855

UNITED STATES PATENT OFFICE

ARMIN HEYL, OF BERLIN-HALENSEE, GERMANY, ASSIGNOR TO GENERAL ELECTRIC COMPANY, A CORPORATION OF NEW YORK

LONG DISTANCE CONDUIT FOR CONVEYING FLUIDS AT HIGH PRESSURE

Application filed July 31, 1931, Serial No. 554,364, and in Germany August 2, 1930.

My invention relates to long distance conduits or pipes for conveying fluid at high pressure and particularly to pipes used in connection with electric power generating plants although it is not necessarily limited thereto. In some cases, for instance in plants designed to feed electric power to a thickly populated district having high peak loads as in large cities, it is advisable to locate the boiler plant in an outer district and to convey live steam through long distance pipes to turbo-generators arranged in close proximity of the densely populated area. In such cases efficient working of the plant can be obtained even with pipes measuring 5 to 10 kilometers in length and with pressure losses in the pipe of 20–60 atms.

Now at peak loads the drop of pressure in the pipe is relatively high so that at the end of the pipe the pressure is considerably lower than at the entrance. In contradistinction thereto, at small loads the drop of pressure in the pipe is relatively small so that in this case the pressure at the end of the pipe is only slightly lower than the pressure at the entrance. These circumstances appear to render it necessary to design the whole of the pipes for the high pressure occurring at partial load which means a very considerable increase in the first costs.

I overcome this drawback by subdividing the pipe into sections having a resistivity to inner pressure corresponding substantially to the pressure distribution occurring at full load and by arranging pressure reducing means such as a valve at the entrance of the pipe, and remote control means for preventing the pressure in the pipe from increasing beyond a predetermined value, to the effect that the pressure in the end section at partial loads does not exceed the pressure occurring at full load in the end section.

In a preferred embodiment of my invention the valve which with respect to its function may be termed a protecting means is operated automatically, for instance in response to the pressure at the end of the pipe or in response to the flow of fluid through the pipe.

In the accompanying drawing I have shown in Fig. 1, by way of example, a long distance conduit for conveying elastic fluid from a source of supply to an elastic fluid engine with pressure control or protecting means in accordance with my invention. Fig. 2 illustrates a modification embodying my invention.

In the drawing B is a steam boiler and T a turbo-generator which are connected with each other by a long distance pipe P. This pipe is subdivided into consecutive sections 1, 2, 3 of decreasing strength, that is, with different resistivity to inner pressure. For instance section 1 may be designed for a pressure of 100 atms., section 2 for 80 atms. and section 3 for 60 atms. 4 is a pressure reducing valve arranged at or near the entrance of the pipe. 5 is a controlling means of any well known kind which regulates the opening of the valve 4 in response to a fluid condition existing at or near the end of pipe P, for instance, in response to the pressure or the flow of fluid in the end section. In the present instance I have shown a remote control mechanism 5 including a pressure responsive device 6 connected by means of a pipe 7 to the end section 3 and having a diaphragm 8 connected to stem 9 of valve 4. 10 is a spring for biasing the valve towards its opening position.

The operation of this device is as follows:

Steam is produced in the boiler B and fed through pipe P to the turbo-generator T. At peak load, that is, when a considerable amount of fluid flows through the conduit, the reducing valve 4 is fully open as in this case, owing to the high pressure drop, a low pressure exists in the end section so that the biasing spring 10 effects full opening of the valve. At peak values a large drop of pressure occurs in the pipe, for instance from 100 atms. in section 1 to 60 atms. in section 3. At normal or at small loads the reducing valve is operated by means of the control device 5 in such manner, that the pressures in sections 2 and 3 cannot exceed the values occurring at peak loads. It will be readily understood that as the demand for elastic fluid decreases the pressure in the end section 3 increases in view of the decreased friction losses. This increase in pressure acting on the diaphragm 8 overcomes the biasing force of spring 10 and thus moves the valve towards closing position. This effects a throttling of the steam, that is, an intitial decrease in pressure of the fluid supplied to the conduit which results in a corresponding decrease of the fluid pressure in the end section. The arrangement is such that under any load condition the pressure in the end section is automatically maintained substantially constant and at a pressure valve corresponding to the pressure existing in the end section at full load. In view of the great length of the pipe P it is advisable to provide an electrical control device. In Fig. 2, where I have shown a modification according to my invention with a remote electro-responsive control for the valve, 11 designates the entrance section of the conduit and 12 is an end section of less strength than the entrance section. 13 is a protecting valve provided near the entrance to the conduit for reducing the fluid pressure at partial load so that the pressure in the end section does not increase beyond pressure values existing in the end section at full load. 14 is a spring for normally biasing the valve towards open position. 15 is a magnet coil surrounding a core fastened to the valve stem. The coil pulls the valve towards closed position in terms of current flowing therethrough. The electric circuit is formed through a wire 16 having one end connected to the coil and the other end to an electric source of supply 17 which in turn is connected through a wire 18 to a resistance 19. 20 is a grounded contact sliding on resistance 19. The other end of the coil is grounded through a wire 21. The contact 20 is moved on resistance 19 in response to a fluid condition in the end section. For this purpose I may provide a pressure responsive device 22 connected to the end section through a pipe 23 and having a diaphragm 24 biased against the pressure be a spring 25. Connected to the diaphragm is a rod 26 which carries contact 20. During operation a decrease in flow of fluid through the conduit causes an increase in pressure in the end section. This pressure acting on the diaphragm causes the contact to move downwardly and thus to decrease the resistance 19 in the circuit. This effects an increase in current and accordingly an increase in pull of the core on the valve such that magnet force overcomes the biasing force of the spring and moves the valve towards its closing position. This results in a throttling of the initial steam pressure in the entrance section 11 and a decrease in pressure in the end section 12. The arrangement may be such that the pressure in the end section is maintained at all loads at a value corresponding to the pressure existing in this section at full load.

Instead of subdividing the pipe into three sections it might as well be subdivided into a greater or lesser number of sections as the case may be.

I wish it to be understood that I do not desire to be limited to the exact details of construction shown and described, for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. A long distance conduit for conveying fluid at high pressure comprising sections of different strength and a pressure reducing valve arranged at the entrance of the conduit for preventing the pressure in the end section from increasing at partial load beyond the pressure existing in the end section at full load.

2. A long distance conduit for conveying fluid at high pressure comprising sections of different strength, a pressure reducing valve arranged at the entrance of the conduit for preventing the pressure in the end section from increasing at partial load beyond the pressure existing in the end section at full load and means for automatically controlling said valve.

3. A long distance conduit for conveying fluid at high pressure comprising sections of different strength, a pressure reducing valve arranged at the entrance of the conduit for preventing the pressure in the end section from increasing at partial load beyond the pressure existing in the end section at full load and means including a pressure responsive device having a pipe connected to the end section for automatically controlling said valve in response to the fluid pressure at the end of said conduit.

4. A long distance conduit for conveying fluid at high pressure comprising sections of different strength, a pressure reducing valve arranged at the entrance of the conduit for preventing the pressure in the end section from increasing at partial load beyond the pressure existing in the end section at full load and electro-responsive means for automatically controlling said valve in response to a fluid condition in the end of said conduit.

5. A long distance conduit for conveying fluid at high pressure comprising sections of decreasing strength as regards the direction of flow of fluid and means provided near the entrance of the conduit and responsive to a fluid condition existing in the end section of the conduit for preventing the fluid pressure in the end section from increasing at partial load beyond the pressure value existing in the end section at full load.

In testimony whereof I affix my signature.

ARMIN HEYL.